(12) United States Patent
Brailean et al.

(10) Patent No.: US 6,498,865 B1
(45) Date of Patent: Dec. 24, 2002

(54) METHOD AND DEVICE FOR CONTROL AND COMPATIBLE DELIVERY OF DIGITALLY COMPRESSED VISUAL DATA IN A HETEROGENEOUS COMMUNICATION NETWORK

(75) Inventors: James C. Brailean, San Diego, CA (US); Mark R. Banham, San Diego, CA (US); Cheuk L. Chan, San Diego, CA (US); Osama Al-Shaykh, San Diego, CA (US); Jiangtao Wen, San Diego, CA (US)

(73) Assignee: PacketVideo Corp,., San Diego, CA (US)

(*) Notice: Subject to any disclaimer, the term of this patent is extended or adjusted under 35 U.S.C. 154(b) by 0 days.

(21) Appl. No.: 09/248,462

(22) Filed: Feb. 11, 1999

(51) Int. Cl.[7] .......................... G06K 9/36; H04N 7/12; H04L 1/00
(52) U.S. Cl. .................. 382/239; 375/240.28; 370/230
(58) Field of Search ............................... 382/232, 239; 375/240.02, 240.27, 240.28, 240.23; 348/533; 370/230, 389, 229; 710/68

(56) References Cited

U.S. PATENT DOCUMENTS

| | | | | |
|---|---|---|---|---|
| 5,898,897 A | * | 4/1999 | Son et al. | ....................... 710/68 |
| 6,111,916 A | * | 8/2000 | Talluri et al. | ........... 375/240.28 |
| 6,222,841 B1 | * | 4/2001 | Taniguchi | .................... 370/389 |

OTHER PUBLICATIONS

Bajaj et al.: "Is Service Priority Useful in Networks?", *ACM Sigmetrics 98*, Joint International Conference on Measurement and Modeling of Computer Systems, Madison, WI, Jun. 22–26, 1998.

Bajaj et al.: "Uniform Versus Priority Dropping for Layered Video," *SIIGCOMM '98*, Vancouver, BC, Canada, Aug. 31–Sep. 4, 1998.

Koenen, R. "MPEG–4 Overview," ISO/IEC JTC1/SC29/WG11 N2725, Seoul, S. Korea, Mar., 1999.

Wang, Y. et al.: "Error Control and Concealment for Video Communication: A Review", *Proc. IEEE*, vol. 86, May, 1998, pp. 974–997.

\* cited by examiner

*Primary Examiner*—Wenpeng Chen
(74) *Attorney, Agent, or Firm*—Patents + TMS, P.C.

(57) ABSTRACT

A method and apparatus automatically manipulates a digitally compressed video bitstream such that the result is compatible with different bandwidth and error resilience requirements at a receiving point in a heterogeneous communication network. The method and device provide for analysis of bitstream header information to determine its relevant coding syntax parameters. Feedback from the receiving point on the network is then used to identify error robustness requirements for an intermediate bitstream. The bitstream is then manipulated by an error robustness regulator to achieve error protection in the network. The bitrate requirements of the network establish a selection of relevant and irrelevant bits from the bitstream The present method and device include identification of irrelevant and low priority video bits; intentional introduction of packet losses to reduce bitrate while maintaining visual quality; use of replacement tags for irrelevant and low priority components of the bitstream for compatible decoding by a wide array of decoders; and insertion of resynchronization tags and translation of predictively coded video packet bits for the improvement of error resilience.

8 Claims, 8 Drawing Sheets

METHOD AND DEVICE FOR CONTROL AND COMPATIBLE DELIVERY OF DIGITALLY COMPRESSED VISUAL DATA IN A HETEROGENEOUS COMMUNICATION NETWORK

FIELD OF THE INVENTION

The present invention relates to automatically managing the delivery of digitally compressed visual data, and more particularly, to a device and method for controlling the bitrate and error robustness of digitally compressed video bitstreams in a heterogeneous communications network.

BACKGROUND OF THE INVENTION

With the advent of new communication systems, it has become possible to communicate digital visual information and data in addition to just voice services efficiently. Such new communication systems comprise both wireline and wireless networks. In the context of wireline networks, packet and circuit switched communication systems have been developed in both the private and public domains for wide and local area coverage. As part of packet-based communications, a significant amount of data is exchanged between local area networks, such as those which are part of a corporate infrastructure, and wide area networks, such as the public Internet. Services to guarantee Quality of Service (QoS) have emerged in this realm to support visual and multimedia communication.

New wireless systems have also been developed to support the transmission of information at higher bitrates than previously possible. These wireless systems conform to international cellular communication standards, and consist of digital communication air-interface standards using Time Division Multiple Access (TDMA) and Code Division Multiple Access (CDMA). An example of widely deployed TDMA communication is the Global System for Mobile communication (GSM). CDMA forms the basis for the third generation cellular communication standard IMT-2000.

Most of these communication systems (wireline and wireless) have been designed to allow for the exchange of a maximum amount of information between users connected within the infrastructure of each system and those using devices outside that infrastructure. For example, IMT-2000 protocols can support data communication from wireless terminals to terminals residing on packet switched wireline systems. Moreover, within these communication systems, terminals, or clients, may connect to other terminals, acting as servers, at different bitrates depending on their location in each system. This leads to the concept of heterogeneous communication networks, which are networks consisting of diverse or dissimilar connections yet often communicating similar information.

Problems arise when considering the communication of visual information in heterogeneous networks. A first problematic issue which arises is that visual information, and, in particular, digitally compressed video signals, require substantially more bandwidth than comparable voice signals compressed over similar time intervals. Transmitting visual information between systems designed with different nominal transmission bitrates presents some difficulty because of delays that result from these incompatible bitrates. In addition, varying error characteristics of the different communication systems in a heterogeneous network also present a problem for the transmission of visual information because it is very difficult to mask errors in the visual space.

These problems do not alone make up the difficulties with communicating visual information over diverse systems. Services designed to exploit the communication of visual information in heterogeneous networks must, necessarily, rely on the existence of digitally compressed video. Therefore, not only creating new content, but exploiting existing content is a primary focus for the further development and success of these services. For one-way visual applications, there is already a substantial amount of digitally encoded content for training and entertainment that could be delivered to mobile subscribers on a wireless network, or to clients connected at dissimilar rates on a wireline network. Existing, or "legacy" video material is primarily encoded using the ISO MPEG-1 and MPEG-2 standards, although legacy content also exists in the form of the ITU-T H.261 and, to a lesser extent, H.263 standards. This material can have high value to new multimedia services, while at the same time lead to the acceptance and use of new visual coding standards such as ISO MPEG-4.

One problem with the delivery of legacy data over the low bandwidth wired and wireless networks is that the original encoded bandwidth typically exceeds the capabilities of the network, assuming that there is a maximum delay restriction on the delivery of that data. For example, some wireless mobile systems may have multimedia terminals supporting MPEG-1 decoding, but the channel rates to the multimedia enabled mobile terminals may be as low as 64 Kbps. In this case, the MPEG-1 material, encoded at 1.5 Mbps, would require substantial buffering delay time before playback could begin. Unless most of the sequence was to be downloaded first, stalling would occur, as the decoder's buffer would empty much faster than it would fill. It is also unlikely that a mobile terminal would be able to provide sufficient memory for buffering long sequences. A requirement exists, therefore, to successfully manipulate this type of high bitrate data to a lower rate such that it is compatible with a low bandwidth connection on the network.

As a result of the arrival of new wired and wireless communication systems with the capacity to transmit and exchange visual information, there is a significant need for a method and device designed to manage the visual content being delivered over these networks. In particular, technology is needed to automatically manage the bitrate and error robustness of pre-existing digital video bitstreams so that they can be delivered in a compatible form to users at arbitrary nodes in a heterogeneous network.

SUMMARY OF THE INVENTION

Briefly, therefore, this invention provides a method and apparatus for changing a digitally compressed video bitstream at a source point in a network, in an automatic way, such that the resulting bitstream is compatible with different bandwidth and error resilience requirements at a receiving point in a heterogeneous communication network. The novel method consists of analyzing the header information of the original bitstream to determine its coding parameters. Feedback from the receiving point on the network is then used to determine error properties of the network. The bandwidth and error resilience requirements establish a prioritization and selection of relevant and irrelevant bits from the original bitstream, of which the relevant bits are manipulated by a robustness regulator to achieve error protection in the network. The principal inventive components of the method include identification of irrelevant and low priority video bits, intentional introduction of packet losses to reduce bitrate, use of replacement tags for irrelevant and low priority components of the bitstream, and insertion of resynchronization tags for the improvement of error resilience.

DETAILED DESCRIPTION OF THE INVENTION

Figure 1:
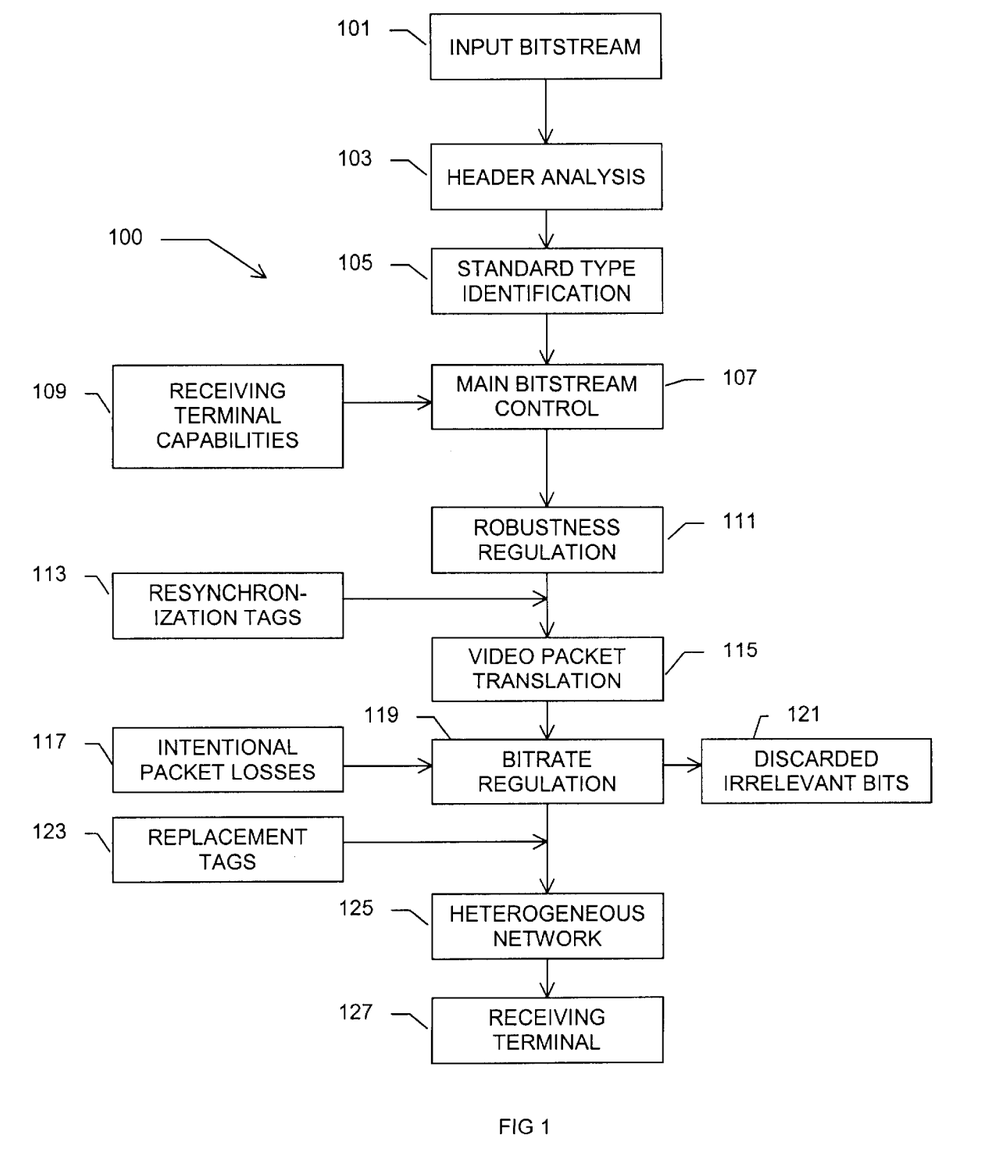
FIG. 1 is a block diagram of a bitstream regulation system operative to manipulate an incoming bitstream and output a bitstream compatible with a receiving terminal in accordance with an embodiment of the present invention.

The present invention is more fully described with reference to FIGS. 1–5. FIG. 1 illustrates a block diagram 100 of a visual bitstream regulation method which defines a control system operated in the manner described herein. The input bitstream 101 is passed through a header analysis stage 103 which extracts information about the type of standard used to create the bitstream. This information is passed through the standard type identification stage 105, which results in the assignment of control parameters in the main bitstream control 107 which is coupled to accept input parameters describing the receiving terminal's capabilities 109. These steps are designed to set up the system for proper regulation and compatible delivery of the bitstream from the sender to the receiving terminal. In particular, identification of the original visual coding standard used to encode the bitstream coupled with information about the capabilities of the receiving terminal determines the extent to which the bitstream must be manipulated before compatible communication is possible.

The output of the main bitstream control step is coupled to the robustness regulation stage 111. In this stage, the bitrate-regulated bitstream is modified to provide a bitstream which is compatible with the error characteristics of the channel connecting the source and receiving terminals. This robustness regulation is dependent on the standard type of the original bitstream identified in 105. The regulation is accomplished through the packetization of bits in the coded frames of visual information in such a way that errors may be detected, localized and concealed by a robust decoder. The use of resynchronization tags 113 is applied for visual bitstreams conforming to standards which support sub-frame resynchronization. The robustness regulation step manipulates the bitstream such that independent decoding is possible for each segment of bits delimited by the inserted resynchronization tags. In the case of predictively coded information, this information is replaced with equivalent information utilizing only predictors within the same segment. This stage is referred to as video packet translation 115. For example, this would apply to the replacement of codewords for motion vector differences computed across resynchronization segments with motion vector differences computed from information in the same segment.

The output of the video packet translation step is directed to the bitrate regulation stage 119 which is coupled to receive intentional packet loss information 117 and, additionally, to discard irrelevant bits 121 in order to reduce the bitstream bitrate. The purpose of the bitrate regulation stage is to adjust the bitrate of the input bitstream so that the delivered stream is compatible with the capabilities of the receiving terminal and its delivery channel. This is accomplished through manipulation and removal of bits in the incoming bitstream. The present method does not provide a mechanism for explicit decoding and re-encoding of bitstreams, also known as transcoding, but rather supports translation of codewords in the compressed domain of the bitstream. The bitrate regulator selectively removes information from the incoming bitstream so that the output bitstream conform to a compatible delivery bitrate. Intentional packet losses 117 provide a mechanism to reduce the bitrate below the lowest base layer bitrate of the original incoming bitstream. The term base layer is used to describe the lowest priority independently decodable layer of a scalable bitstream. When selected packets of bits are dropped, the truncated bitstream can still be effectively decoded without substantial quality degradation by a robust decoder at the receiving terminal.

The use of replacement tags 123 inserted into the bitstream enables a decoder to seamlessly decode a bitrate-regulated bitstream without additional capabilities over those of the nominal relevant standard decoder. An example of this is the case where a standard such as MPEG-2 requires a pre-specified coded frame rate, such as 30 frames per second, but where frames are dropped by the bitrate regulator. In this instance, the replacement tags are predetermined binary codewords which represent empty frames, and which preserve the time relationships of coded frames in the bitstream.

Finally, the manipulated incoming bitstream is delivered to the heterogeneous network and subsequently to the receiving terminal. The inventive method 100 outlined above provides a solution to the problem of delivering standardized digitally compressed visual information from a variety of sources to receiving terminals with dissimilar bandwidth and error robustness capabilities. The overall method supports all classes of existing visual coding standards by adapting to the specific syntax elements of each, and utilizing each stage of the present method for its purpose only to the degree to which it still produces a bitstream which conforms to that standard.

Figure 2:
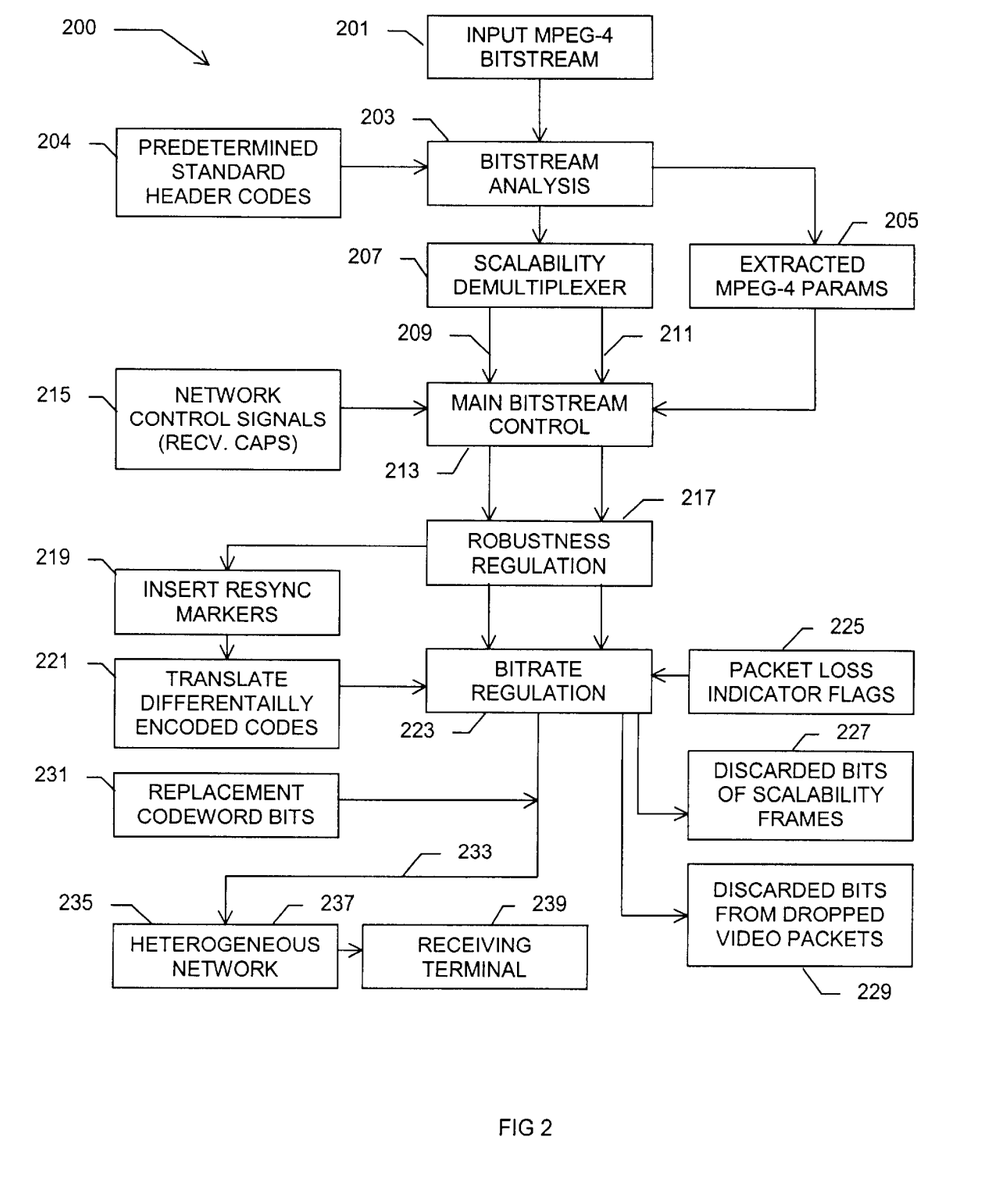
FIG. 2 is a generalized flow diagram of a preferred embodiment of a method for regulating a bitstream encoded with scalable information to produce a bitstream compatible with a receiving terminal in accordance with the present invention.

FIG. 2 illustrates a generalized flow diagram 200 of a preferred embodiment of a method for regulating a bitstream encoded with prioritized frame types such as INTRA (I), PREDICTED (P), and BI_DIRECTIONALLY PREDICTED (B) frames, and/or scalable frame types including temporal, spatial, and SNR scalability frames. Examples of voluntary international standards for the bitstreams having I, P, and B frames include MPEG-1, MPEG-2, MPEG-4, and H.263 v2. Examples of standards for bitstreams having scalability frames include MPEG-2, H.263 v2, and MPEG-4. In all cases, the preferred embodiment 200 defines a method for manipulating a standards compliant bitstream with multiple frame types in order to regulate the bitrate and error robustness of that bitstream before delivery over a heterogeneous network.

The preferred embodiment of the present invention is shown in the flow diagram 200 with respect to an incoming MPEG-4 bitstream 201 with two layers: a base layer 209 and a temporal scalability enhancement layer 211. The temporal scalability enhancement layer is a syntax element supported by the MPEG-4 standard, and consists of multiple frames of video which are temporally interleaved with the video frames of the base layer. A decoder can decode all, some, or no frames of the temporal scalability layer without affecting the nominal quality of the decoded base layer. This is a result of the fact that the scalability layer is not used for the prediction of any information at an equal or lower layer of scalability in the syntax of MPEG-4.

The incoming bitstream 201 is analyzed as shown at 203 with the input of a predetermined list of standard header codes 204. The analysis exhaustively compares the list of standard header codes with the relevant leading bits in the incoming bitstream to determine the standard and syntax used to compress the bitstream. The bitstream is then demultiplexed 207 to provide two independent bitstreams, a base layer 209 and a temporal scalability layer 211. Parameters defining the relationship and type of the base and enhancement layers are extracted from the incoming bitstream 205 and passed to the main bitstream control stage 213 of this preferred embodiment. The independent bitstreams 209 and 211 are jointly processed by the main bitstream control stage. The main bitstream control stage is also coupled to receive control signals from the network 215 which describe the capabilities of the receiving terminal, identified as "Recv. Caps" in 215. In particular, these control signals indicate the desired bandwidth to be transmitted over the network and the location of the receiver terminal on the network. This location information describes the channel state of the receiving terminal and indicates whether it is connected through a wired or wireless branch of the network.

The main bitstream control 213 passes the bitstreams to the robustness regulation stage 217. The error resilience of the input data is adjusted so that the effect of errors is mitigated in the decoder at the receiving terminal. In the preferred embodiment described by the flow diagram 200 in FIG. 2, this is accomplished by the insertion of resync markers 219 into the base layer bitstream 209, a syntax element of MPEG-4 which permits the localization of errors in a robust decoder. With the insertion of these markers, it can be necessary to adjust the codewords in the bitstream so that predictively coded information does not require values from independent video packets, which are spatial regions represented by bits contained in segments delimited by different sets of resync markers. This is accommodated by the translation of differentially encoded codes 221, explained in more detail below.

Figure 3A:
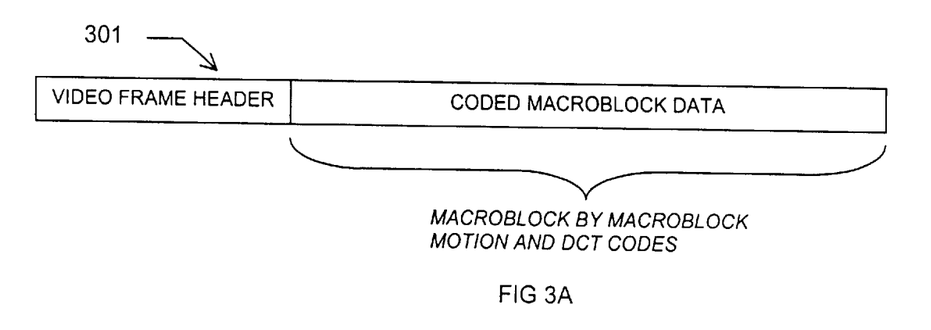
FIGS. 3A, 3B and 3C illustratively provide examples of insertion of resynchronization tags into a bitstream and translation of differentially encoded components within a video packet to support robust decoding.
Figure 3B:
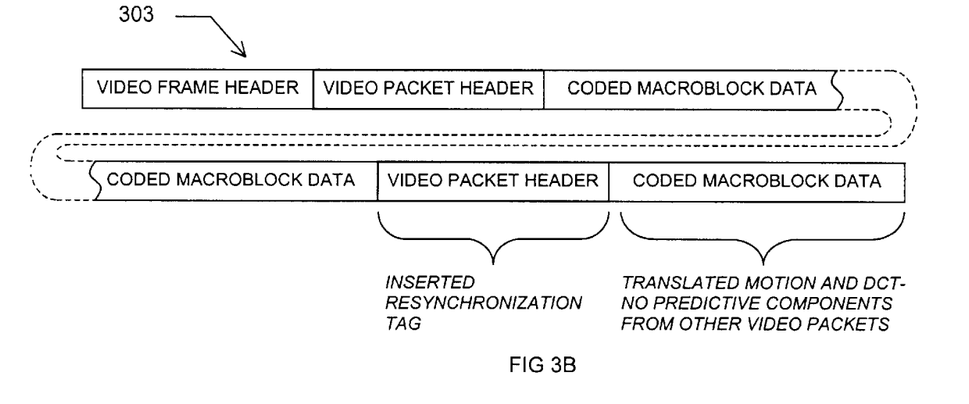
Figure 3C:
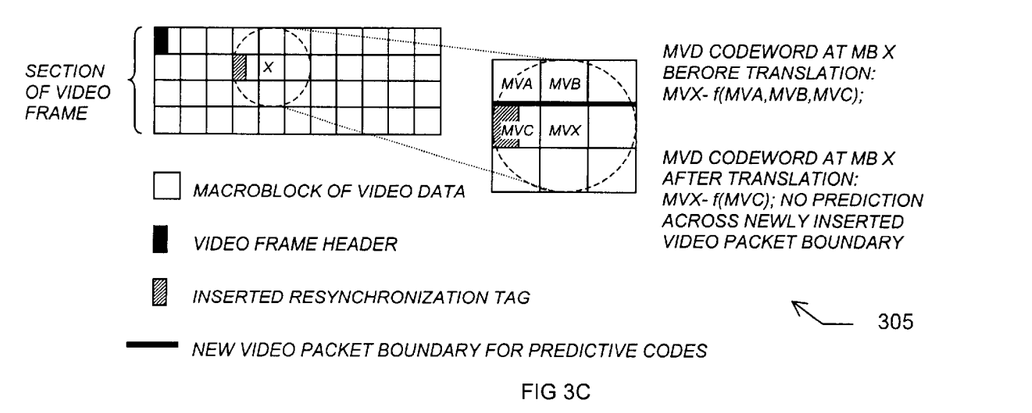

FIGS. 3A, 3B and 3C illustratively provide examples of insertion of resynchronization tags into a bitstream and translation of differentially encoded components within a video packet to support robust decoding. In FIG. 3A, an illustration 301 is shown of an original video frame bitstream of the highest level of syntax elements of a video frame having no sub-frame resynchronization. Such a bitstream has poor error resilience in the presence of channel errors because all of the information is predictively coded within the coded macroblock data portion of the bitstream. When errors are introduced, it is impossible to continue decoding until the next unique video frame header is encountered. This poor localization of errors is remedied by the present invention as illustrated in FIG. 3B and generally designated at 303. In the illustration 303, a bitstream with video packet resynchronization is shown. In this bitstream, the inserted resynchronization tags enable a decoder to localize errors to smaller portions of the bitstream, and consequently produce a greater level of quality at a receiving terminal in an error prone heterogeneous communications network. The method for translating predictively coded codewords within the newly formed video packets is illustrated at 305 in FIG. 3C with respect to the most common predictively coded syntax element: motion vectors. As seen in the enlarged detail view in FIG. 3C, the motion vector codeword at macroblock X is computed as the difference of the motion vector at X and a function of those at neighboring macroblock positions A, B, and C. When a resynchronization tag is inserted as described with reference to FIG. 3B, a new video packet boundary for predictive codes arises. This boundary prevents the corruption of the current video packet in the event that any neighboring video packet is corrupted due to errors. Thus, the motion vector codeword, referred to as a motion vector difference (MVD) is computed only with respect to the nearest macroblock residing within the same video packet. This is shown in FIG. 3C as MVX-f(MVC), instead of MVX-f(MVA,MVB,MVC), where f(a) is a function defined by the syntax of the relevant video standard, and usually defined as the median operator. The method of localizing predictive codes includes parsing and identifying only the present codewords which use predictive coding in the relevant standard, and translating those to the appropriate symbols for the localized predictive codewords. In the context of MPEG-4, this applies to simple translation of motion vector difference codewords, as illustratively shown at 305 in FIG. 3C, and in the same fashion to any predictively coded texture data including quantization parameters and DCT coefficient values.

After the robustness regulation stage 217, the modified bitstream data, and those components of the bitstreams not modified by steps 219 and 221 are delivered to the bitrate regulation stage 223. Two techniques are used to achieve the desired bitrate, which is lower than the bitrate of the incoming bitstream. The first approach to the reduction of bitrate is through the discarding of bits associated with low priority frames in the bitstream. Bits associated with temporal scalability frames represent the lowest priority bits and are discarded from the incoming bitstream first as shown at 227. The base layer bitstream represents the lowest bitrate bitstream achievable without directly impacting the performance of a typical decoder. Intentional packet losses are then introduced through packet loss indicator flags 225 coupled to the bitrate regulation stage 223. These packet loss indicator flags 225 are used to discard bits 229 from the base layer bitstream resulting in an output bitstream which has reduced bitrate.

The introduction of intentional packet losses represents a key novel element of this preferred embodiment. The particular means to intentionally introduce packet losses to the base layer bitstream uses a predetermined dropping scheme. A predetermined scheme for intentionally dropping packets is to remove the bits associated with non-contiguous logical resynchronization segments of each video frame, known in MPEG-4 as video packets, at uniform spacing until the desired bitrate reduction has been achieved. When a packet is dropped from a frame, a packet which does not overlap the same spatial region in the next frame is dropped. This prevents the serious degradation of any single region of the scene. This is accomplished by keeping historical information about the macroblock numbers in each dropped packet. Packets beginning with macroblock numbers overlapping the macroblock range of the last dropped packet are not dropped. The first sequential non-overlapping packet in the next frame is the first candidate for dropping according to this method. This use of statistical information in the introduction of packet losses is integral in reducing the bitrate without substantially degrading the video quality.

When "data partitioning" has been used within a video packet of the incoming bitstream, only the texture coding components of the video packet are dropped in this preferred embodiment. When data partitioning has not been used within a video packet of the incoming bitstream, the combined motion and texture components of the video packet are dropped in this preferred embodiment. When sub-frame resynchronization markers have not been used in the original bitstream, or inserted by the robustness regulation stage, entire frames of video are dropped by this method. When dropping entire frames, B frames are the lowest priority and dropped first, followed by P and then I frames. P Frames which are furthest in time from a previous I frame are dropped prior to other P frames. This is because the likelihood of new I frames appearing in the bitstream for resynchronizing the scene increases in time from the last coded I frame. The use of this stage of the method is enhanced by the existence of a robust decoder at the receiving terminal 239. Though not required for the successful implementation of the present invention, such a terminal will conceal the errors introduced by dropping bits from video packets.

Figure 4A:
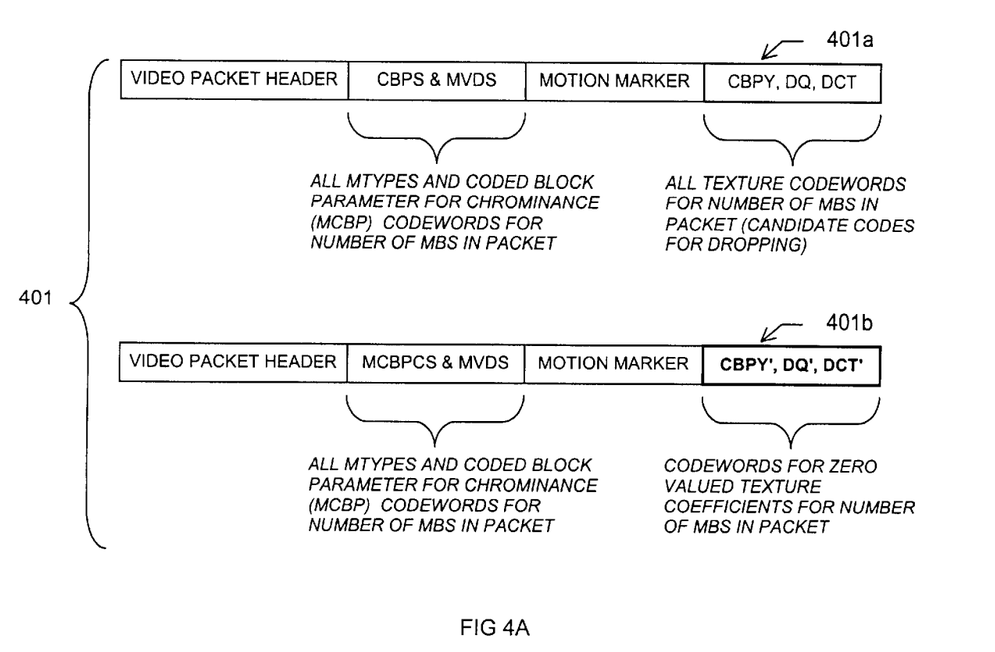
FIGS. 4A and 4B illustratively provide examples of insertion of replacement tags into a bitstream after bitrate regulation to preserve the decoded quality at a compatible receiving terminal.
Figure 4B:
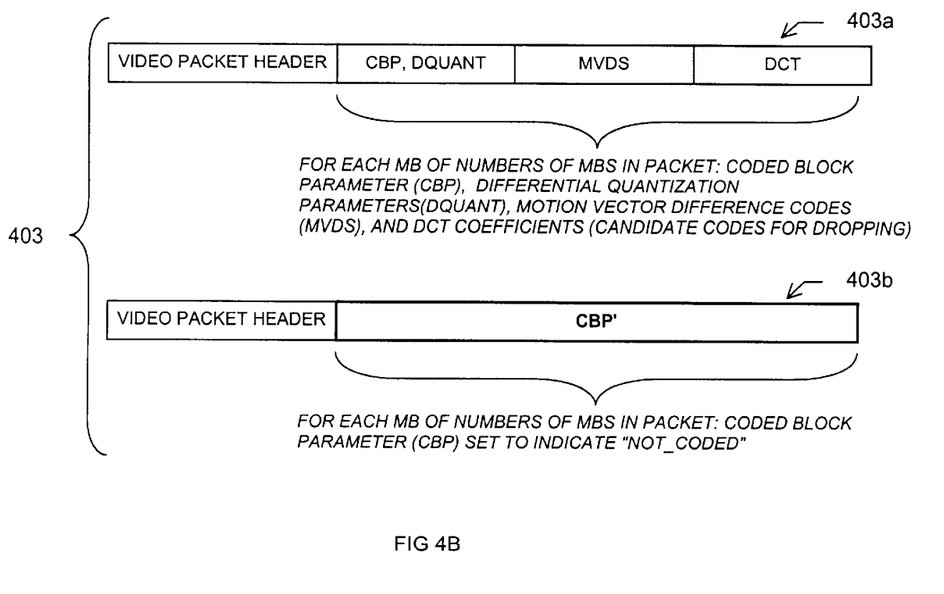

If the receiving terminal capabilities indicate that the video decoder is not a robust decoder, it is necessary to insert replacement information into that bitstream in order to guarantee accurate decoding at a receiving terminal. The introduction of replacement codeword bits 231 accomplishes this task in the next step of the method. In a preferred embodiment as shown by the flow diagram 200, resynchronization packets are dropped in step 223. FIGS. 4A and 4B further describe the inserting of replacement information for two scenarios of dropped MPEG-4 video packet information in accordance with this preferred embodiment. In the first example 401 shown in FIG. 4A, bits associated with the texture coding part of a video packet are dropped by the bitrate regulator 217 in FIG. 2. Portion 401a of the first example identifies an original data partitioned video packet bitstream; and portion 401b represents video packet bitstream with replacement tags. The bits dropped, which are delimited by a unique motion marker, are associated with the spatial prediction error codewords (CBPY, DQ, DCT), which decode to values applied to a spatial portion of a video frame after motion compensation has been applied. This information is the lowest priority component of an MPEG-4 video packet. While this example illustratively provides details for the syntax of MPEG-4, the identical concept applies to the video syntax of the MPEG-2 standard. In example 401, replacement bits are inserted into the bitstream in the form of code words for zero valued prediction error coefficients (CBPY',DQ',DCT'). These codewords require negligible bitrate in relation to the bitrate consumed by the dropped bits. A more extreme case of the same concept is illustrated in example 403 shown in FIG. 4B, where data partitioning is not present in the incoming bitstream. Portion 403a of FIG. 4B represents an original combined motion texture video packet bitstream; and portion 403b represents a video packet bitstream with replacement tags. In this case, all of the bits associated with the payload of the video packet are dropped. The video packet header remains and is used to indicate the bounding macroblock information for the video packet. The replacement bits used are the codewords for combined motion and texture information for blocks containing no motion and no prediction error information (CBP'). This is referred to as "NOT CODED" codewords in example 403. Again, as in example 401, the bitrate consumed by the replacement bits is negligible in comparison to the bitrate consumed by the original video packet under consideration.

Continuing with the description of the preferred embodiment of the present method described by FIG. 2, a bitrate regulated bitstream is output at 233 from the bitrate regulation stage. The output bitstream is delivered to the heterogeneous network 237 for subsequent decoding at the receiving terminal 239.

Figure 5:
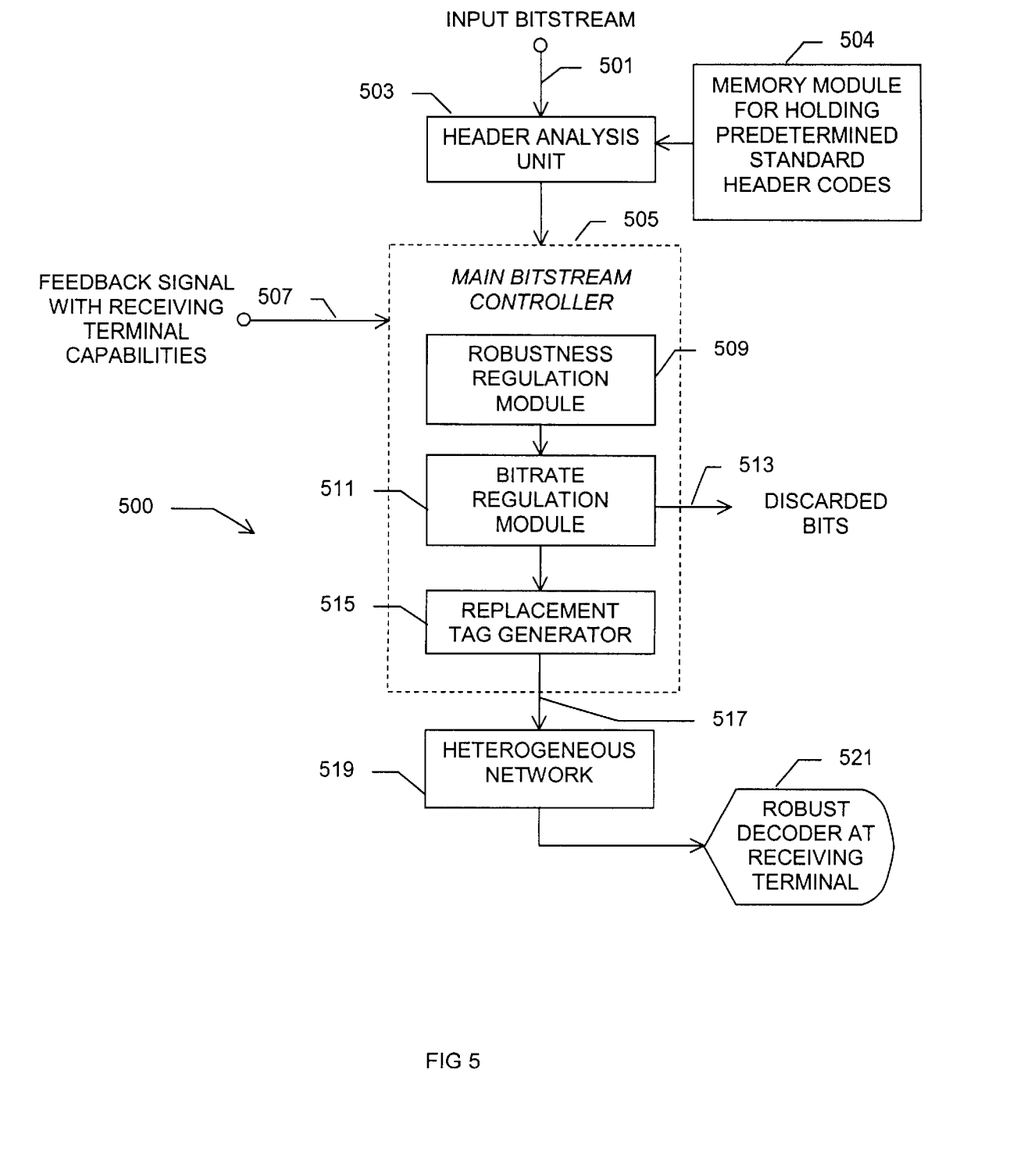
FIG. 5 illustrates a block diagram of a preferred embodiment of a device for manipulating bits in a bitstream of encoded video data to produce a bitstream compatible with a receiving terminal in accordance with the present invention.

FIG. 5 illustrates a diagram of a device 500 for manipulating a digitally compressed video bitstream to produce an output bitstream compatible with the bandwidth and error resilience requirements of heterogeneous communications network. The device 500 comprises a header analysis unit for determining a standard type and a syntax used to compress the input bitstream 501 coupled to a main bitstream controller 505. A header analysis unit 503 is coupled to receive input from a memory module holding a list of predetermined standard header codes 504 enabling the analysis unit to compute the present standard and syntax by exhaustive matching of header bits. The main bitstream controller 505 is a means for discarding selected bits from the input bitstream on the basis of the syntax determined in the unit 503. The main bitstream controller 505 comprises a robustness regulation module 509, a bitrate regulation module 511, and a replacement tag generator 515.

The robustness regulation module 509 is a means for inserting predetermined bits into the bitstream to improve the error robust localization and decoding of the bitstream in accordance with the standard type and syntax determined in the unit 503. The robustness regulation module 509 also translates any predictively coded information into codewords relying only on bits within the present video packet in accordance with inserted resynchronization markers. Operation of the robustness regulation module 509 is reliant on signals from the header analysis unit 503 and feedback from the receiving terminal 507, which are both coupled to input to the main bitstream controller 505 containing those modules.

The output of the robustness regulation module 509 is coupled to input to the bitrate regulation module 511, which is a means to discard selected bits 513 from the bitstream on the basis of the standard type and the syntax determined in the unit 503. The bitrate regulation module 509 is a means for dropping low priority bits associated with frames in an enhancement layer of a scalable bitstream, and means for discarding packets of low priority bits associated with segments in a packet of video bits delimited by resynchronization markers or picture headers. The bitrate regulation module 509 also contains memory for recording historical information of the packets dropped in a previous frame which is used to compute the next packets to drop. This enables avoiding repetitive removal of identical spatial areas of a scene.

The bitrate regulation module 511 produces an output which is compatible with the capabilities of a receiving terminal as indicated by the feedback signal 507 coupled to input to the main bitstream controller 505. The output of the bitrate regulation module 511 is coupled to the input of the replacement tag generator 515, which is a means for inserting predetermined bits to improve the decoding of the bitstream in accordance with the standard type and syntax determined in the unit 503. In particular, the replacement tag generator 515 replaces bits dropped by the bitrate regulation module 509 with short code words designed to preserve timing and spatial information in any decoder such that it will not suffer from unrecoverable errors.

The output of the main bitstream controller 505 is coupled to a heterogeneous network 519, which in turn delivers a resultant bitstream 517 to a robust decoder at a receiving terminal 521. The device 500 is capable of manipulating bitstreams generated by any video coding standard. Depending on the degree of flexibility of the particular standard, varying degrees of functionality in terms of bitrate regulation and error robustness are achieved. In general, the most recent standards, H.263 and MPEG-4, can provide for the most fine control of these bitstream attributes by the device 500.

Although exemplary embodiments are described above, it will be obvious to those skilled in the art that many modifications and alterations to this method and device for bitstream control and delivery may be made without departing from the invention. Accordingly, it is intended that all such modifications and alterations be included within the spirit and scope of the invention as defined in the following claims.

We claim:

1. A method for manipulating bits in a bitstream of encoded video data, said method comprising the steps of:

determining a standard type and a syntax used to compress the bitstream;

inserting predetermined bits into the bitstream and translating predictively coded information resulting in an intermediate bitstream with improvement of error robust localization and with improvement of decoding of the bitstream in accordance with the standard type and the syntax;

discarding selected bits from the intermediate bitstream based on the standard type and the syntax used to compress the bitstream resulting in an output bitstream having a bitrate compatible with that of a robust receiving terminal;

discarding packets of low priority bits associated with segments in a packet of video bits delimited by resynchronization markers or picture headers; and selecting packets to discard on the basis of historical information of packets dropped in a previous frame to avoid repetitive removal of identical spatial areas of a scene.

2. The method of claim 1 wherein the step of determining standard type and a syntax used to compress the bitstream further comprises the step of:

reading header bits; and comparing said bits to a predetermined list of standard headers to identify a present standard type and syntax used to compress the bitstream.

3. The method of claim 1 wherein the step of inserting predetermined bits and translating predictively coded information further comprises the step of:

inserting resynchronization markers; and translating differentially encoded motion vectors and associated texture data parameters to limit predictive coding to within a video packet.

4. The method of claim 1 wherein said step of discarding selected bits further comprises the step of:

discarding low priority bits associated with frames in an enhancement layer of a scalable bitstream.

5. A device for manipulating bits in a bitstream of encoded video. data, said device comprising:

means for determining a standard type and a syntax used to compress the bitstream;

means for inserting predetermined bits into the bitstream and translating predictively coded information resulting in an intermediate bitstream with improvement of error robust localization and with improvement of decoding of the bitstream in accordance with the standard type and the syntax;

means for discarding selected bits from the intermediate bitstream based on the standard type and the syntax used to compress the bitstream resulting in an output bitstream having a bitrate compatible with that of a robust receiving terminal;

means for discarding packets of low priority bits associated with segments in a packet of video bits delimited by resynchronization markers or picture headers; and means for selecting packets to discard based on historical information of packets dropped in a previous frame to avoid repetitive removal of identical spatial areas of a scene.

6. The device of claim 5 wherein said means for determining a standard type and a syntax used to compress the bitstream further comprises:

means for reading header bits and comparing said bits to a predetermined list of standard headers to identify a present standard type and syntax used to compress the bitstream.

7. The device of claim 5 wherein said means for inserting predetermined bits and translating predictively coded information further comprises:

means for inserting resynchronization markers and translating differentially encoded motion vectors and associated texture data parameters to limit predictive coding to within a video packet.

8. The device of claim 5 wherein said means for discarding selected bits further comprising:

means for discarding low priority bits associated with frames in an enhancement layer of a scalable bitstream.

* * * * *